(12) United States Patent
Hansson

(10) Patent No.: US 9,481,358 B2
(45) Date of Patent: Nov. 1, 2016

(54) METHOD FOR ENGINE STARTING IN A HYBRID VEHICLE

(71) Applicant: VOLVO TRUCK CORPORATION, Göteborg (SE)

(72) Inventor: Mattias Hansson, Göteborg (SE)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 14/649,378

(22) PCT Filed: Dec. 7, 2012

(86) PCT No.: PCT/EP2012/005061
§ 371 (c)(1),
(2) Date: Jun. 3, 2015

(87) PCT Pub. No.: WO2014/086383
PCT Pub. Date: Jun. 12, 2014

(65) Prior Publication Data
US 2015/0321658 A1 Nov. 12, 2015

(51) Int. Cl.
*B60W 10/02* (2006.01)
*B60W 10/10* (2012.01)
(Continued)

(52) U.S. Cl.
CPC ............. *B60W 20/106* (2013.01); *B60K 6/26* (2013.01); *B60K 6/48* (2013.01); *B60K 6/547* (2013.01); *B60W 10/02* (2013.01); *B60W 10/06* (2013.01); *B60W 10/08* (2013.01); *B60W 10/10* (2013.01); *B60W 10/11*
(Continued)

(58) Field of Classification Search
None
See application file for complete search history.

(56) References Cited

U.S. PATENT DOCUMENTS 6,098,584 A * 8/2000 Ahner ..................... F02N 5/04
123/179.3
6,354,974 B1 * 3/2002 Kozarekar ............... B60K 6/26
180/65.21

(Continued)

FOREIGN PATENT DOCUMENTS

DE 101 43 289 A1 3/2003
DE 103 38 558 A1 3/2004

(Continued)

OTHER PUBLICATIONS

Tenberge P: 11 Double-Clutch Transmission—Power-Shiftable Winding Transmission , VDI Berichte. Duesseldorf. DE.vol. 1665. Mar. 13, 2002 pp. 1033-1050. XP009094673, ISSN: 0083-5560 p. 1047-p. 1048.

(Continued)

*Primary Examiner* — Yonel Beaulieu
*Assistant Examiner* — Krishnan Ramesh
(74) *Attorney, Agent, or Firm* — WRB-IP LLP

(57) ABSTRACT

A starting method for starting an internal combustion engine of a hybrid vehicle involves detecting at least one engine related parameter to determine whether an electric machine is to be used for cranking the engine and opening the clutch to separate the electric machine from the engine. Subsequently, the at least one detected engine related parameter is used to select rotatable components to be used for assisting engine start. The selected components are rotated by connecting the countershaft to the clutch. The electric machine is operated. The clutch is then closed in order to start the engine.

31 Claims, 7 Drawing Sheets

(51) Int. Cl.
 B60W 10/06 (2006.01)
 B60W 10/113 (2012.01)
 B60W 30/192 (2012.01)
 B60K 6/26 (2007.10)
 B60K 6/48 (2007.10)
 B60K 6/547 (2007.10)
 B60W 20/00 (2016.01)
 B60W 10/08 (2006.01)
 B60W 10/11 (2012.01)

(52) U.S. Cl.
 (2013.01); *B60W 10/113* (2013.01); *B60W 20/00* (2013.01); *B60W 20/40* (2013.01); *B60W 30/192* (2013.01);
 CPC *B60K 2006/268* (2013.01); *B60K 2006/4816* (2013.01); *B60W 2510/0676* (2013.01); *B60W 2510/087* (2013.01); *B60W 2510/244* (2013.01); *B60W 2510/246* (2013.01); *B60W 2550/12* (2013.01); *B60W 2710/021* (2013.01); *B60W 2710/06* (2013.01); *B60W 2710/081* (2013.01); *B60W 2710/1005* (2013.01); *B60Y 2400/428* (2013.01); *Y02T 10/6221* (2013.01); *Y02T 10/6256* (2013.01); *Y02T 10/6286* (2013.01); *Y10S 903/906* (2013.01); *Y10S 903/93* (2013.01)

(56) References Cited

U.S. PATENT DOCUMENTS

| | | | | |
|---|---|---|---|---|
| 7,360,616 B2 * | 4/2008 | Schiele | ............... | B60K 6/48 180/65.265 |
| 8,142,328 B2 * | 3/2012 | Reuschel | ............... | B60K 6/387 180/65.275 |
| 8,241,173 B2 * | 8/2012 | Holmes | ............... | B60K 6/48 475/5 |
| 2002/0117860 A1 * | 8/2002 | Man | ............... | B60K 6/365 290/46 |
| 2005/0155803 A1 * | 7/2005 | Schiele | ............... | B60K 6/48 180/65.25 |
| 2009/0017988 A1 * | 1/2009 | Reuschel | ............... | B60K 6/387 477/167 |
| 2011/0167956 A1 * | 7/2011 | Holmes | ............... | B60K 6/48 74/665 B |

FOREIGN PATENT DOCUMENTS

| | | |
|---|---|---|
| DE | 10 2008 031456 A1 | 1/2010 |
| EP | 2 246 230 A1 | 11/2010 |
| JP | 2000142136 | 5/2000 |
| JP | 2012176713 | 9/2012 |
| JP | 2012228960 | 11/2012 |
| JP | 2012228961 | 11/2012 |
| WO | 2008131838 A1 | 11/2007 |
| WO | 2012123171 A1 | 9/2012 |

OTHER PUBLICATIONS

International Search Report (Aug. 9, 2013) for corresponding International App. PCT/EP2012/005061.
Japanese Official Action (Aug. 9, 2016) for corresponding Japanese App. 2015-545672.

* cited by examiner

METHOD FOR ENGINE STARTING IN A HYBRID VEHICLE

BACKGROUND AND SUMMARY

The invention relates to a method and an arrangement using the inertia of different sets of rotatable internal transmission components in a single or dual-clutch transmission for assisting an electric machine during engine start-up under predetermined conditions.

A hybrid vehicle comprises an internal combustion engine, which transmits torque to the driving wheels by means of a transmission provided with a gear box, and at least one electric machine which is electrically connected to an electric storage system and mechanically connected to the driving wheels.

Hybrid vehicles can be operated in a thermal operating mode, in which the torque is generated only by the internal combustion engine and where the electric machine may work as a generator for recharging the storage system. Alternatively, hybrid vehicles can be operated in electric operating mode, in which the engine is switched off and the torque is generated only by the electric machine working as a motor. A third operating mode is a combined operating mode, in which the torque is generated both by the engine and by the electric machine working as a motor. Furthermore, in order to increase the overall energy efficiency during all steps of decelerating, the electric machine may be used as a generator for a regenerative deceleration in which the kinetic energy possessed by the vehicle is partially converted into electricity, which is stored in the storage system, instead of being completely dissipated in friction within the brakes.

A suitable transmission for a hybrid vehicle comprising an internal combustion engine and an electric machine is shown in WO 2012/123171. This document relates to a hybrid drive of a motor vehicle, which comprises an automated manual transmission (AMT) with a dual clutch transmission having two coaxially arranged input shafts and a common output shaft. One of the input shafts of said hybrid drive can be connected to the drive shaft of an internal combustion engine and can be drivingly connected to the output shaft by means of an associated first group of selectively shiftable gearwheel sets and the other input shaft is drivingly connected to the rotor of an electric machine that can be operated as a motor and as a generator, and can be drivingly connected to the output shaft by means of an associated second group of selectively shiftable gearwheel sets. The gearwheel sets are arranged between one of the two input shafts and one of two countershafts that are drivingly connected to the output shaft by means of an output constant, every gearwheel set comprising a fixed gear fixedly arranged on the associated input shaft and a free wheel arranged on the corresponding countershaft. Per input shaft at least the two transmission-internal gearwheel sets with free wheels arranged on different countershafts are arranged in a common radial plane using a common fixed wheel. At least two free wheels arranged on one of the two countershafts can be coupled to each other by two transmission-internal gearwheel sets associated with different input shafts by means of a winding shift element. The two output constants are arranged in a common radial plane using a common output wheel arranged on the output shaft.

The electric machine can be disconnected from the driving wheels, whereby it can be used to start the internal combustion engine. In this way, the electric machine can assist or replace a starter motor for starting the engine. When the engine is "cold", the engine requires the application of a relatively high torque (indicatively even 2-4 times higher than the cranking torque needed to start a "warm" engine) to the crankshaft, because due to the low temperature, the lubricant oil inside the engine is not very viscous and creates a high mechanical resistance. A traditional starter motor is able to apply a very high torque to the crankshaft of the engine by virtue of a very high gear-down ratio (for instance 1:10) between the starter motor and the engine crankshaft. The electric machine of a hybrid vehicle is normally mechanically connected to the crankshaft of the engine with a relatively low gear-down ratio (often unitary, i.e. 1:1, providing no gear-down). Therefore, the electric machine of a hybrid vehicle may not be capable of generating the very high cranking torque needed to start the engine when the engine is cold and/or when the ambient temperature is low. In this context, the term "cold" denotes temperatures around ambient temperature. "Low" ambient temperature is used to denote temperatures around or below freezing.

US 2002/117860 describes a solution to this problem, where it is suggested to mechanically couple the electric machine to the crankshaft of the engine with two different, automatically selectable transmission ratios: a first more geared-down ratio is selected during a step of starting the engine, while a second, more direct ratio (i.e. less geared-down ratio) is selected for the remaining use of the electric machine. However, this solution requires a complex construction because a servo-controlled gear box would have to be interposed between the electric machine and the crankshaft.

WO 2007/131838, US 2005/155803, US 2009/017988 and U.S. Pat. No. 6,354,974 disclose solutions where the electric machine is separated from the crankshaft of the engine by a clutch. In order to start the engine, the clutch is opened, the electric machine is "idled" and the clutch is closed with the electric machine rotating so as to also exploit the inertia (i.e. the kinetic energy) of the electric machine for making the engine rotate. However, such a "launched" starting mode may also not be sufficient to start an engine which has a high displacement and with a high number of cylinders. Furthermore, the "launched" starting mode allows to apply a high cranking torque to the crankshaft needed to start a "cold" engine, but which is redundant to start a "warm" engine; therefore, when the engine is "warm", the "launched" starting mode may unnecessarily impose high mechanical stresses on the transmission components and unnecessarily determines a certain delay when starting the engine due to the time needed to "idle" the electric machine.

DE 196 45 943 describes starting the engine with a "launched" starting mode which includes making the electric motor rotate before mechanically connecting the electric machine to the engine when the engine is "cold". When the engine is "warm" a conventional starting mode is used in which the electric machine is mechanically connected to the engine before it starts to rotate.

GB 2 413 998 describes starting the engine with a "launched" starting mode which includes making the electric machine rotate before mechanically connecting the electric machine to the engine. The launch (or crank) rotation speed, i.e. the rotation speed which should be reached by the electric machine before mechanically connecting the electric machine to the engine, is determined according to the temperature of the engine so that the launch rotation speed is higher when the engine is "cold".

A problem with the above solutions is that the use of an "idled" or a "launched" starting mode may not be sufficient for cranking the engine under adverse operation conditions.

A further problem is that the suggested solution cannot be applied to a vehicle provided with a dual-clutch transmission.

It is desirable to provide an improved method for starting an engine that solves the above problems.

In the subsequent text, the term "transmission arrangement" is intended to describe the parts of a transmission located between an internal combustion engine crankshaft and a drive shaft driving at least one pair of driven wheels. The transmission arrangement preferably, but not necessarily, includes a range gear connected to the drive shaft.

The term "engine" will be used to denote an internal combustion engine, while the term "motor" will be used to denote an electric machine. Such an electric machine will be capable of being operated both as a motor, for assisting the engine, and as a generator, for charging an energy storage or driving accessories. When operated as a motor, the electric machine can be used for cranking the engine, for assisting the engine or for electric drive only.

The term "energy storage" will be used to denote a high voltage battery used for cranking or propelling a hybrid vehicle using the electric machine. The term "starter battery" or "starting battery" is used for describing a separate battery (12/24 V) dedicated for cranking an engine, usually by means of a separate starter motor not to be confused with the electric machine defined above. In the text, the invention is referred to as a method for "starting" an internal combustion engine, wherein the starting operation includes "cranking" of the engine. However, for the purpose of the invention, these terms are considered interchangeable.

According to a preferred embodiment, the invention relates, according to an aspect thereof, to a method for starting an internal combustion engine of a hybrid vehicle. The vehicle comprises an engine provided with a crankshaft, which crankshaft is connectable to at least one pair of driving wheels via a transmission arrangement. The vehicle further comprises a transmission, which can be a single or dual-clutch transmission, connectable to the engine. The transmission comprises multiple rotatable components for transmitting torque from the engine to the driving wheels.

The transmission has at least one input shaft wherein at least one clutch is arranged to connect a corresponding input shaft to the engine. The transmission further comprises an output shaft and at least a first countershaft which are connectable to the at least one clutch by means of a number of manually and/or automatically selectable gears. An electric machine is mechanically connected to the countershaft downstream of the at least one clutch, so that said clutch is interposed between the electric machine and the engine.

During normal operation of the vehicle, when the vehicle is in motion, the electric machine is connected to the at least one clutch, depending on the currently selected gear. During this operation gears can be selected manually, by the driver, automatically, or by an electronic control unit (ECU) using a predetermined gear change strategy.

During an engine start-up, when the vehicle is normally stationary, the electric machine can be connected to the at least one clutch under the control of the ECU only.

The starting method comprises the steps of:
  detecting at least one engine related parameter to determine whether the electric machine is to be assisted for cranking the engine;
  opening at least one clutch to separate the electric machine from the engine;
  controlling the transmission for separating the electric machine from the driving wheels;
  selecting at least one of a number of sets of rotatable transmission components to be used for assisting engine start, based on the at least one detected engine related parameter,
  engaging at least one gear, connecting the at least one selected set of rotatable transmission components to the at least one clutch;
  operating the electric machine as a motor to rotate the at least one selected set of rotatable transmission components and to reach predetermined crank rotation speed; and
  closing one of the clutches when the electric machine reaches the crank rotation speed, in order to start the engine.

The term "crank rotation speed" is used to define a rotational speed of the electric machine that is sufficient for cranking the engine.

As stated above, the number of rotatable components in the single or dual-clutch transmission to be used for assisting engine start is selected depending on the at least one detected engine related parameter. The starting method is primarily intended for use in low ambient temperatures, low engine coolant temperatures, and/or when the electric motor torque available from the electric machine is deemed to be near or below the torque required to ensure a successful cranking of the engine. The available electric motor torque is dependent on the energy storage temperature and/or the state of charge (SOC) of the energy storage or high voltage battery. During a cold start, the energy storage temperature will be dependent on the ambient temperature.

When it is detected that the energy storage or high voltage battery used for cranking the engine may not be able to deliver sufficient electric power for cranking the engine, using the electric machine connected directly to one of the clutches, then it is determined that the electric machine requires assistance during cranking. If the engine is normally started by means of a separate starter motor acting on the engine flywheel, a detected condition (low starter battery voltage, low ambient temperature and/or low engine coolant temperature) can cause the electric machine to take over the function of the starter motor.

According to a first example, the method involves operating the electric machine and using the moment of inertia of a first set of rotatable components. The first set comprises the rotary masses of the electric machine, the countershaft, at least one input shaft and at least one clutch for assisting the electric machine when cranking the engine. The method according to the first example is carried out when the electric motor torque available from the electric machine is deemed to be near or below the torque required to ensure a successful cranking of the engine. As stated above, the available electric motor torque is dependent on the temperature and/or the state of charge (SOC) of the energy storage or high voltage battery. During a cold start, the energy storage temperature will be dependent on the ambient temperature. It is determined that the electric machine requires assistance during cranking if the ambient temperature, the energy storage temperature and/or the state of charge (SOC) of the energy storage has dropped below a first set of predetermined limits or is outside a first range of predetermined limits.

In a second example, an additional selected set of rotatable transmission components is used for cranking the engine. In this example, the method involves operating the electric machine and using the rotary masses of the electric machine, the countershaft, at least one first input shaft, at least one clutch, as well as an output shaft, for assisting the electric machine when cranking the engine. In this case, the output shaft with its associated gears forms a second set of rotatable components. The method according to the second example is carried out when the ambient temperature, the energy storage temperature and/or the state of charge (SOC) of the energy storage or starting battery has dropped below a second set of predetermined limits. The second set of predetermined limits is lower than the first set of limits or is outside a second range of predetermined limits. This indicates that the electric machine will require additional assistance during engine start. The assistance provided by the second example is greater than that provided by the first example, as it involves additional rotary masses.

According to a first alternative embodiment, the invention relates to a method for starting an internal combustion engine of a hybrid vehicle. The vehicle comprises an engine provided with a crankshaft, which crankshaft is connectable to at least one pair of driving wheels via a transmission arrangement. The vehicle further comprises a dual-clutch transmission connectable to the engine. The dual-clutch transmission comprises multiple rotatable components for transmitting torque from the engine to the driving wheels. The dual-clutch transmission has a first and a second input shaft of which the first input shaft is a solid shaft connected to a first clutch and the second input shaft is a hollow shaft connected to a second clutch. The second input shaft is co-axially supported in the first input shaft. The dual-clutch transmission further comprises an output shaft and at least a first countershaft which are connectable to the first clutch and the second clutch, respectively, by means of a number of manually and/or automatically selectable gears. An electric machine is mechanically connected to the countershaft downstream of the clutches, so that the clutches are interposed between the electric machine and the engine. The electric machine can be connected to one or both clutches by the actuation of one or two gears, respectively.

During normal operation of the vehicle, when the vehicle is in motion, the electric machine is connected to one of the clutches, depending on the currently selected gear. During this operation gears can be selected manually, by the driver, automatically, or by an electronic control unit (ECU) using a predetermined gear change strategy.

During an engine start-up, when the vehicle is normally stationary, the electric machine can be connected to one or both clutches under the control of the ECU only.

The starting method comprises the steps of:
detecting at least one engine related parameter to determine whether the electric machine is to be used for cranking the engine;
opening the clutches to separate the electric machine from the engine; and
separating the electric machine from the driving wheels;
When the dual-clutch transmission has been separated from the engine and the driven wheels, the method according to the invention performs the further steps of:
selecting one of a number of sets of rotatable transmission components to be used for assisting engine start, based on the at least one detected engine related parameter,
engaging one gear, connecting the at least one selected set of rotatable transmission components to one clutch;
engaging a further gear, connecting at least the countershaft to the other clutch;
operating the electric machine as a motor to rotate the selected rotatable components and to reach a predetermined crank-rotation speed; and
closing one of the clutches when the electric machine reaches the crank-rotation speed, in order to start the engine.

In a first example of the first alternative embodiment, only one selected set of rotatable transmission components is used for cranking the engine. In this example, the first gear is used for connecting the countershaft to the first clutch. In addition, the second gear is used for connecting the countershaft to the second clutch. When the electric machine is actuated, the countershaft will drive both the first clutch, together with the first input shaft, and the second clutch, together with the second input shaft, through the first gear and the second gear, respectively. These parts form a first set of rotatable components. When the electric machine reaches the predetermined crank rotation speed the second clutch is closed to crank and start the engine. In this example, the momentum from the first clutch and the first input shaft will be transferred to the countershaft via the second gear, providing a predetermined gear ratio multiplier. The torque from the electric machine will be transferred to the second clutch, the second input shaft and the output shaft via the first gear. The electric machine is deemed to require assistance by a first set of selected set of rotatable transmission components during cranking if at least one detected engine related parameter has dropped below a first set of predetermined limits or is outside a first range of predetermined limits.

It is also possible to close the first clutch for cranking the engine, but in order to utilize the optimum gear ratio for transferring the inertia of the rotating transmission components to the engine during start, the second clutch is selected.

According to the first example as described above, the electric machine is separated from the driving wheels by disconnecting the first and second input shafts from the output shaft.

In a second example of the first alternative embodiment, an additional selected set of rotatable transmission components is used for cranking the engine. In this example, the method involves operating the electric machine and using the rotary masses of the electric machine, the countershaft, the first and second input shafts, the first and second clutches, as well as the output shaft, for assisting the electric machine when cranking the engine. In this case, the output shaft with its associated gears forms a second set of rotatable components. The method according to the second example is carried out when the electric machine is deemed to require assistance by the first and an additional, second set of selected set of rotatable transmission components during cranking.

The method according to the second example is used when the at least one detected engine related parameter is below a second set of predetermined limits or is outside a second range of predetermined limits, lower than said first set of limits. This indicates that the electric machine will require additional assistance during engine start. The assistance provided by the second example is greater than that provided by the first example, as it involves additional rotary masses.

In the second example, the second gear is used for connecting the countershaft to the second clutch. In addition, a base gear is used for connecting the countershaft and the output shaft to the first clutch. When the electric machine is actuated, the countershaft will drive the first clutch together with the first input shaft and the output shaft through the base gear. At the same time, the countershaft will drive the second clutch and the second input shaft through the second gear. When the electric machine reaches the predetermined crank rotation speed the first clutch is closed to crank and start the engine. In this example, the momentum from the second clutch and the second input shaft and the torque from the electric machine will be transferred to the first clutch, the second input shaft and the output shaft via the base gear, providing a further predetermined gear ratio multiplier.

It is also possible to close the second clutch for cranking the engine, but in order to utilize the optimum gear ratio for transferring the inertia of the rotating transmission components to the engine during start, the first clutch is selected.

According to the second example as described above, the electric machine is separated from the driving wheels by disconnecting the output shaft from a range gear interposed between the output shaft and the driving wheels.

According to a second alternative embodiment, the invention relates to a method for starting an internal combustion engine of a hybrid vehicle comprising a single-clutch transmission connectable to the engine. The single-clutch transmission comprises multiple rotatable components for transmitting torque from the engine to the driving wheels. The single-clutch transmission has a first input shaft which is a solid shaft connected to a first clutch. The single-clutch transmission further comprises an output shaft and at least a first countershaft which are connectable to the first clutch by means of a number of manually and/or automatically selectable gears. An electric machine is mechanically connected to the countershaft downstream of the clutch, so that the clutch is interposed between the electric machine and the engine. The electric machine can be connected to the clutch by the actuation of one or two gears, respectively.

During normal operation of the vehicle, when the vehicle is in motion, the electric machine is connected to the clutch via the currently selected gear. During this operation gears can be selected manually, by the driver, automatically, or by an electronic control unit (ECU) using a predetermined gear change strategy.

During an engine start-up, when the vehicle is normally stationary, the electric machine can be connected to the clutch under the control of the ECU only.

The starting method comprises the steps of:
  detecting at least one engine related parameter to determine whether the electric machine is to be used for cranking the engine;
  opening the clutch to separate the electric machine from the engine; and
  separating the electric machine from the driving wheels;
When the single-clutch transmission has been separated from the engine and the driven wheels, the method according to the invention performs the further steps of:
  selecting one of a number of sets of rotatable transmission components to be used for assisting engine start, based on the at least one detected engine related parameter;
  engaging one gear, connecting the at least one selected set of rotatable transmission components to the clutch;
  operating the electric machine as a motor to rotate the selected rotatable components and to reach a predetermined crank-rotation speed; and
  closing the clutch when the electric machine reaches the crank-rotation speed, in order to start the engine.

In a first example of the second alternative embodiment, only one selected set of rotatable transmission components is used for cranking the engine. In this example, the second gear is used for connecting the countershaft to the first clutch. When the electric machine is actuated, the countershaft will drive a first set of rotatable components, comprising the rotary masses of the electric machine, the countershaft, the first input shaft and the first clutch, for assisting the electric machine when cranking the engine. When the electric machine reaches the predetermined crank rotation speed the first clutch is closed to crank and start the engine. In this example, the momentum will be transferred from the countershaft to the first clutch and the first input shaft via the second gear, providing a predetermined gear ratio multiplier. The torque from the electric machine will be transferred by the same transmission components. The electric machine is deemed to require assistance by a first set of selected set of rotatable transmission components during cranking if at least one detected engine related parameter has dropped below a first set of predetermined limits or is outside a first range of predetermined limits.

According to the first example as described above, the electric machine is separated from the driving wheels by disconnecting the first input shaft from the output shaft.

In a second example of the second alternative embodiment, a first and a second set of rotatable transmission components are used for cranking the engine. In this example, the second gear is used for connecting the countershaft to the first clutch. In this example, the method involves operating the electric machine and using the rotary masses of the electric machine, the countershaft, the first input shaft, the first clutch, as well as the output shaft, for assisting the electric machine when cranking the engine. In this case, the output shaft with its associated gears forms a second set of rotatable components. The method according to the second example is carried out when the electric machine is deemed to require assistance by an additional, second set of selected set of rotatable transmission components during cranking. The second set of predetermined limits is lower than the first set of limits or is outside a first range of predetermined limits, indicating that the electric machine will require additional assistance during engine start. The assistance provided by the second example is greater than that provided by the first example, as it involves additional rotary masses.

In this second example, a base gear is used for connecting the countershaft and the output shaft to the input shaft and the first clutch. When the electric machine is actuated, the countershaft will drive the first clutch, together with the first input shaft, and the output shaft through the base gear. When the electric machine reaches the predetermined crank rotation speed the first clutch is closed to crank and start the engine. In this example, the momentum from the countershaft and the output shaft and the torque from the electric machine will be transferred to the first clutch via the base gear, providing a predetermined gear ratio multiplier.

According to the second example as described above, the electric machine is separated from the driving wheels by disconnecting the output shaft from a range gear interposed between the output shaft and the driving wheels.

According to the method and any one of the examples given above, at least the temperature and/or the state of charge of an energy storage used for cranking the engine is detected. The energy storage is preferably a high voltage main storage battery or energy storage used for propulsion of the vehicle. According to one example, the temperature of the energy storage or the state of charge (SOC) of the energy storage are detected to determine whether the electric motor torque available from the electric machine is sufficient for cranking the engine. When the detected temperature and/or state of charge (SOC) is below at least one predetermined limit, the electric machine is operated as a starter motor and is given different levels of assistance using a variable number of rotary components in the dual-clutch transmission during the cranking of the engine. The operation of the electric machine and the dual-clutch transmission is controlled by an electronic control unit (ECU). At least one predetermined limit for detected temperature and SOC can be stored in the ECU, where the degree of assistance provided by the dual-clutch transmission is decided by the current temperature and/or SOC.

According to a further example, it is determined that the electric machine is to be assisted during the cranking of the engine when it is detected that the ambient temperature is below a predetermined limit. The torque required for cranking the engine is dependent on the engine friction, which in turn is primarily dependent on the ambient temperature. According to a further example, it is determined that the electric machine is to be assisted during the cranking of the engine when it is detected that the engine coolant temperature is below a predetermined limit. The amount of assistance required for the electric machine can be determined by each of the above detected parameters individually or in combination. For instance, if the temperature and/or the SOC of the energy storage is below a first predetermined limit, the ECU can decide that a level of assistance according to the first example described above is sufficient for cranking the engine. However, a further condition to be checked can be the ambient temperature and/or the engine coolant temperature. If one or both of these parameters are below a predetermined limit, then The ECU can decide that an additional level of assistance according to the second example described above must be provided for cranking the engine.

An additional parameter that can be controlled in connection with the engine start is the rotation speed of the electric machine. The ECU can determine the crank rotation speed according to the at least one engine related parameter. For instance, additional torque can be provided for engine start by increasing the crank rotation speed if one or more detected engine related parameters are below a set of predetermined limit values. The selected crank rotation speed rotation speed can be used for determining a closing speed of the closing clutch used during the cranking operation.

The invention further relates to a vehicle comprising an internal combustion engine and a single or dual-clutch transmission, which engine is started by means of the method as described above. The invention allows the degree of assistance provided by the transmission during a start-up procedure to be controlled by adapting the number of rotational components in the single or dual-clutch transmission. The degree of assistance is determined by detecting one or more engine related parameters and comparing detected values with predetermined limit values, as described above.

The present invention also relates to a computer program, computer program product and a storage medium for a computer all to be used with a computer for executing the method as described in any one of the above examples.

BRIEF DESCRIPTION OF THE DRAWINGS

In the following text, the invention will be described in detail with reference to the attached drawings. These schematic drawings are used for illustration only and do not in any way limit the scope of the invention. In the drawings.

DETAILED DESCRIPTION

Figure 1:
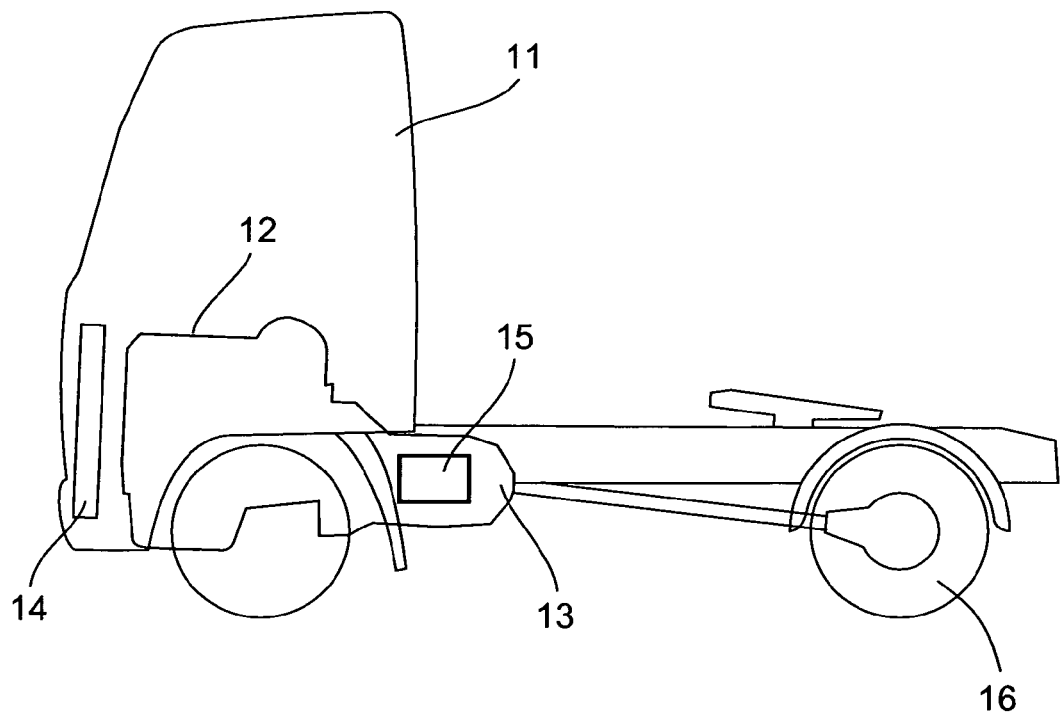
FIG. 1 shows a schematically indicated vehicle with a transmission arrangement for use with a method according to the invention.

FIG. 1 shows a schematically indicated vehicle 11 with a transmission arrangement for use with a method according to the invention. The vehicle 11 is provided with an internal combustion engine (ICE) 12 connected to a transmission 13, such as an automated manual transmission (AMT), for transmitting torque to a vehicle drive axle (not shown). The ICE 12 is connected to a radiator arrangement 14 for cooling engine coolant and oil from the ICE 12. The transmission 13 is controlled by the driver or automatically via an electronic control unit (ECU) 15. The ECU 15 is provided with control algorithms for controlling the transmission independently during, for instance, an engine start requested by the driver. The transmission is controlled to select a gear ratio between the engine 12 and a pair of driven wheels 16.

Figure 2:
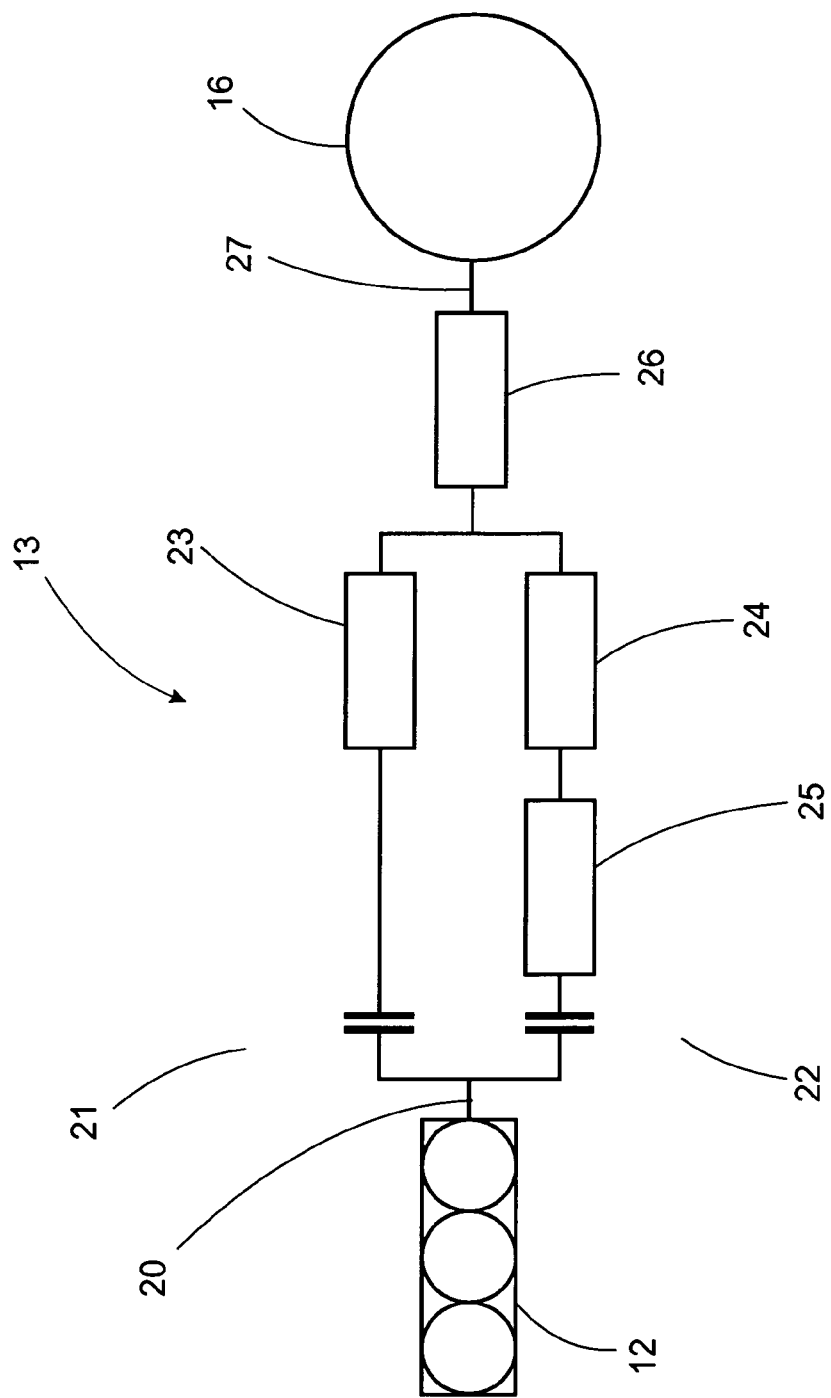
FIG. 2 shows a schematic diagram of a transmission arrangement suitable for use in a vehicle as indicated in FIG. 1.

FIG. 2 shows a schematic diagram of a transmission arrangement suitable for use in a vehicle as indicated in FIG. 1. The engine 12 has a crankshaft that is connected to the transmission 13 via an engine output shaft 20. The transmission 13 comprises a dual clutch arrangement having a first and a second clutch 21, 22, respectively. The first clutch 21 can be controlled to connect the engine output shaft 20 to a first gearbox unit 23, comprising a first input shaft, an output shaft and a number of gears that can be actuated for controlling the gear ratio between the engine 12 and the driven wheels 16. Similarly, the second clutch 22 can be controlled to connect the engine output shaft 20 to a second gearbox unit 24, comprising a countershaft and a number of gears that can be actuated for controlling said gear ratio. The countershaft of the second gearbox unit 24 is also connected to an electric motor 25, which can be used for assisting the engine 12 in a hybrid drive mode, or for cranking the engine during an engine-on mode. The first and second gearbox units 23, 24 will be described in further detail below. Using the first and a second clutches 21, 22 in turn, the gears of the first and second gearbox units 23, 24 can be used for driving a range gear 26 connected to the output shaft. In this example, the range gear 26 is a planetary gear, having a sun wheel driven by the output shaft. The range gear 26 is connected to a drive shaft 27 for driving the wheels 16.

The range gear can be provided with an additional controllable clutch (not shown), in order to allow the range gear to be disconnected from the rest of the transmission during certain engine-on or engine starting modes.

Examples of different engine starting modes for a hybrid vehicle using a transmission as schematically shown in FIG. 2 will be described in connection with FIGS. 3 and 4.

Figure 3:
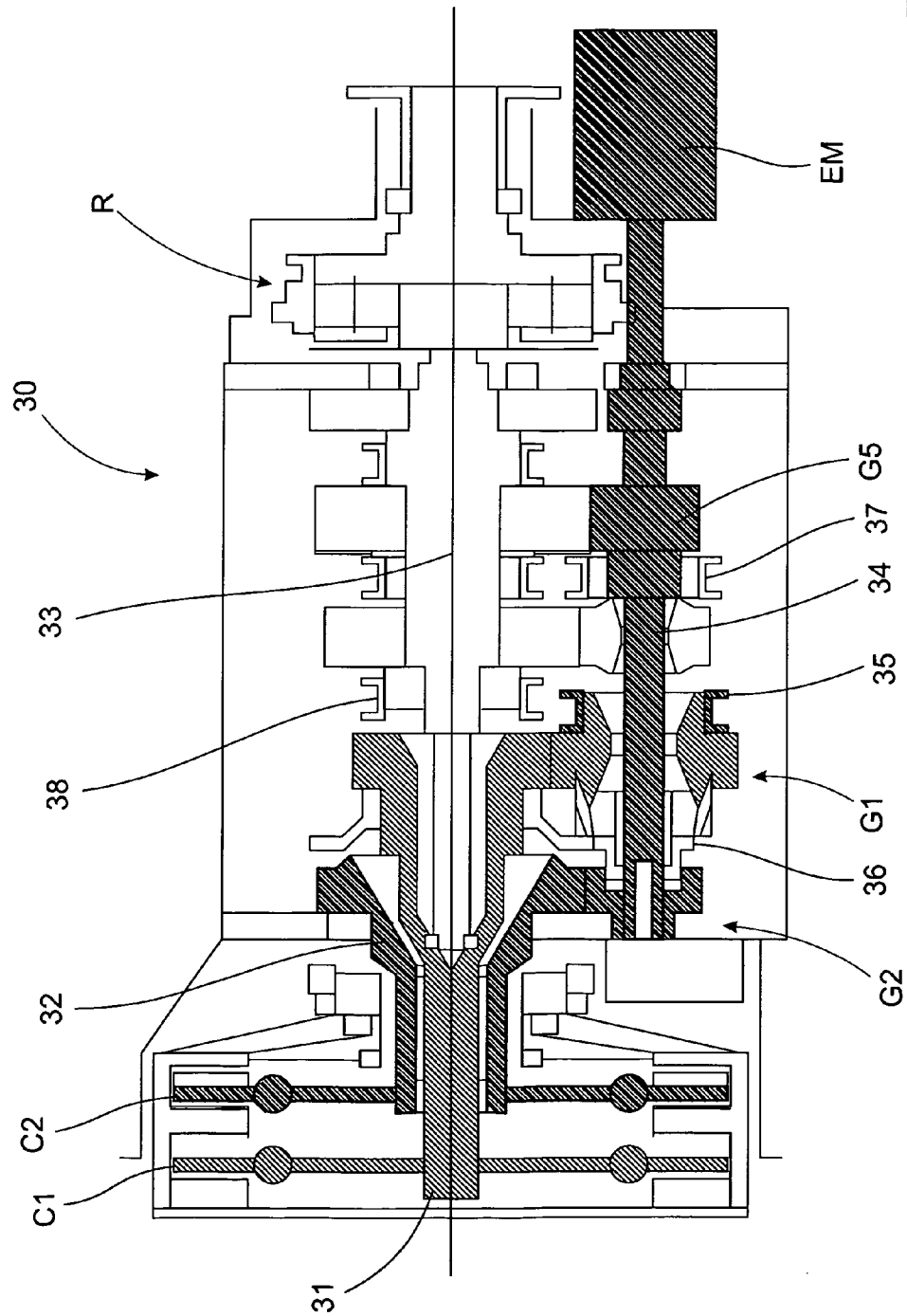
FIG. 3 shows a schematic cross-section of a transmission arrangement according to a first example of a first embodiment of the invention.

FIG. 3 shows a schematic cross-section of a transmission arrangement according to a first example of a first embodiment of the invention. The method according to the first example is carried out when the electric motor torque available from the electric machine is deemed to be near or below the torque required to ensure a successful cranking of the engine. This condition occurs when at least one detected engine related parameter is below a first set of predetermined limits or is outside a first range of predetermined limits.

The transmission arrangement is connected between the engine output shaft of an engine (not shown; see FIG. 2) and a drive shaft, which drive shaft is connectable to at least one pair of driving wheels (not shown). In this example the transmission arrangement comprises a dual-clutch transmission 30 connectable between the engine output shaft and the drive shaft. The dual-clutch transmission comprises multiple rotatable components for transmitting torque from the engine to the driving wheels. The dual-clutch transmission has a first and a second input shaft 31, 32 of which the first input shaft 31 is a solid shaft connected to a first clutch C1 and the second input shaft 32 is a hollow shaft connected to a second clutch C2. The second input shaft 32 is co-axially supported in the first input shaft 31. The dual-clutch transmission further comprises an output shaft 33 and at least a first countershaft 34 which are connectable to the first clutch C1 and the second clutch C2, respectively, by means of a number of manually and/or automatically selectable gears. In this example, the selectable gears are first gear through fifth gear. An electric machine EM is mechanically connected to the countershaft 34 downstream of the clutches C1, C2, so that the clutches are interposed between the electric machine and the engine. The electric machine EM can be connected to one or both clutches by the actuation of one or two gears.

During an engine start-up, when the vehicle is normally stationary, the electric machine EM can be connected to one or both clutches C1, C2 under the control of an electronic control unit (not shown, see FIG. 1).

The starting method comprises the steps of:
  detecting at least one engine related parameter to determine whether the electric machine EM is to be used for cranking the engine;
  opening the clutches C1, C2 to separate the electric machine from the engine; and
  separating the electric machine EM from the driving wheels;

When it has been determined that assistance is required for engine start, the dual-clutch transmission has been separated from the engine and the driven wheels, the following steps are carried out:
  using the at least one detected engine related parameter to select at least a first set of rotatable components to be used for assisting engine start;
  engaging an initial gear, connecting at least the countershaft 34 to one clutch C1; C2;
  engaging a further gear, connecting at least the countershaft 34 to the other clutch C2; C1;
  operating the electric machine EM as a motor to rotate the selected rotatable components and to reach predetermined crank rotation speed; and
  closing one of the clutches C1, C2 when the electric machine EM reaches the crank-rotation speed, in order to start the engine.

As stated above, the number of rotatable components in the dual-clutch transmission to be used for assisting engine start is selected depending on the at least one detected engine related parameter. The starting method is primarily intended for use in low ambient temperatures, low engine coolant temperatures, and/or when it is detected that the energy storage used for cranking the engine may not be able to deliver sufficient torque for cranking the engine using the electric machine connected directly to one of the clutches. Hence, the at least one detected engine related parameter can be the ambient temperature, engine coolant temperature or state of charge (SOC) of the energy storage. If the engine is normally started by means of a separate starter motor acting on the engine flywheel, a detected condition can cause the electric machine to take over the function of the starter motor.

The selected crank rotation speed can be used for determining how the clutch is controlled to crank the engine. The electronic control unit can select a suitable closing speed for closing clutch during the cranking operation based on a predetermined parameter, such as the crank rotation speed. This feature can be applied to any one of the embodiments described here.

According to the first example, the method involves operating the electric machine EM and using the rotary masses (moment of inertia) of the electric machine EM, the countershaft 34, the first and second input shafts 31, 32 and the first and second clutches C1, C2 for assisting the electric machine EM when cranking the engine. The method according to the first example is carried out when one or more of the ambient temperature, engine coolant temperature, energy storage temperature and/or the state of charge (SOC) of the energy storage or starting battery have dropped below a first set of predetermined limits. This condition indicates that the electric machine will require a predetermined level of assistance during engine start.

In this first example, the first gear G1 is used for connecting the countershaft 34 to the first clutch C1. The first gear G1 is selected by means of an actuator 35, which is displaced to engage the first gear G1, controlled by the ECU. In addition, the second gear G2 is used for connecting the countershaft 34 to the second clutch C2. The second gear G2 is selected by means of an actuator 36, which is displaced to engage the second gear G2, controlled by the ECU. When the electric machine EM is actuated, the countershaft 34 will drive both the first clutch C1, together with the first input shaft 31, and the second clutch C2, together with the second input shaft 32, through the first gear G1 and the second gear G2, respectively. When the electric machine EM reaches the predetermined crank rotation speed, the second clutch C2 is closed to crank and start the engine. In this example, the momentum of the first clutch C1 and the first input shaft 31 will be transferred to the countershaft 34 via the second gear G2, providing a predetermined gear ratio multiplier. The torque from the electric machine EM, as well as the momentum of the second input shaft 32 and the output shaft, will be transferred to the second clutch C2 via the first gear G1. In FIG. 3, the heavier shading of the second clutch C2 is used to indicate which clutch is closed for cranking the engine.

It is also possible to close the first clutch C1 for cranking the engine, but in order to utilize the optimum gear ratio for transferring the inertia of the rotating transmission components to the engine during start, the second clutch C2 is selected in this example.

According to the first example as described above, the electric machine EM is separated from the driving wheels by disconnecting the first and second input shafts 31, 32 from the output shaft 33. Further, the gear wheels arranged on the output shaft 33 are not drivingly connected to the output shaft 33. The gear wheel pairs arranged on the output shaft 33 and the counter shaft 34 can be defined as base gears, where G5 is one of the base gears. This base gear definition can also be applied for the embodiment of FIGS. 5 and 6 described below.

Figure 4:
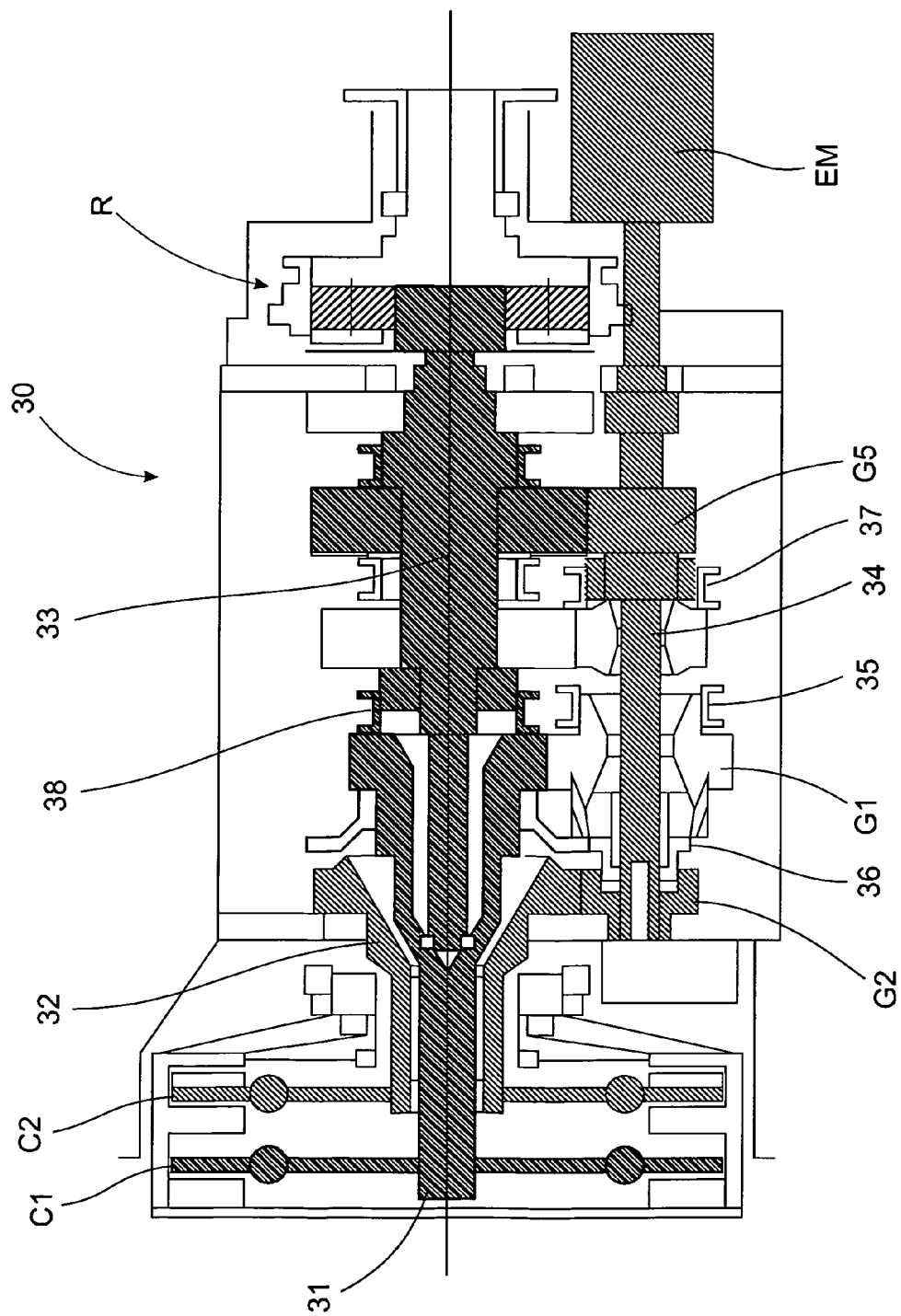
FIG. 4 shows a schematic cross-section of the transmission arrangement in FIG. 3 according to a second example of a second embodiment of the invention.

FIG. 4 shows a schematic cross-section of a transmission arrangement according to a second example of the first embodiment of the invention. The method according to the second example is carried out when the electric motor torque available from the electric machine in the first example is deemed to be near or below the torque required to ensure a successful cranking of the engine. This condition occurs when at least one detected engine related parameter is below a second set of predetermined limits or is outside a second range of predetermined limits.

According to the second example, the method involves operating the electric machine and using the rotary masses of the electric machine EM, the countershaft 34, the first and second input shafts 31, 32, the first and second clutches C1, C2, as well as the output shaft 33 for assisting the electric machine EM when cranking the engine. The method according to the second example is carried out when one or more of the ambient temperature, engine coolant temperature, energy storage temperature and/or the state of charge (SOC) of the energy storage or starting battery have dropped below a second set of predetermined limits. The second set of predetermined limits is lower than the first set of limits, indicating that the electric machine will require additional assistance, in excess of the predetermined level described in the first example (FIG. 3), during an engine start.

In the second example, the second gear G2 is used for connecting the countershaft 34 to the second clutch C2. The second gear G2 is selected by means of an actuator 36, which is displaced to engage the second gear G2, controlled by the ECU. In addition, the fifth gear G5 (a base gear) is used for connecting the countershaft 34 and the output shaft 33 to the first clutch C1. The fifth gear G5 is selected by means of an actuator 37, which is displaced to engage the fifth gear G5, controlled by the ECU. At the same time, a further actuator 38 is controlled by the ECU to connect the first input shaft 31 and the output shaft 33. When the electric machine EM is actuated, the countershaft 34 will drive the first clutch C1, together with the first input shaft 31, and the output shaft 33 through the fifth gear G5. At the same time, the countershaft 34 will drive the second clutch C2 and the second gear G2. When the electric machine EM reaches the predetermined crank rotation speed the first clutch C1 is closed to crank and start the engine. In this example, the momentum from the second clutch C2 and the second input shaft 32 and the torque from the electric machine EM will be transferred to the first clutch C1, the second input shaft 32 and the output shaft 33 via the fifth gear G5, providing a predetermined gear ratio multiplier. In FIG. 4, the heavier shading of the first clutch C1 is used to indicate which clutch is closed for cranking the engine.

It is also possible to close the second clutch C2 for cranking the engine, but in order to utilize the optimum gear ratio for transferring the inertia of the rotating transmission components to the engine during start, the first clutch C1 is selected.

According to the second example as described above, the electric machine EM is separated from the driving wheels by disconnecting the output shaft 33 from a range gear R interposed between the output shaft 33 and the driving wheels. This can be achieved by means of a clutch (not shown) in the range gear R.

Further examples of different engine starting modes for a hybrid vehicle using a transmission as schematically shown in FIG. 2 will be described in connection with FIGS. 5 and 6.

Figure 5:
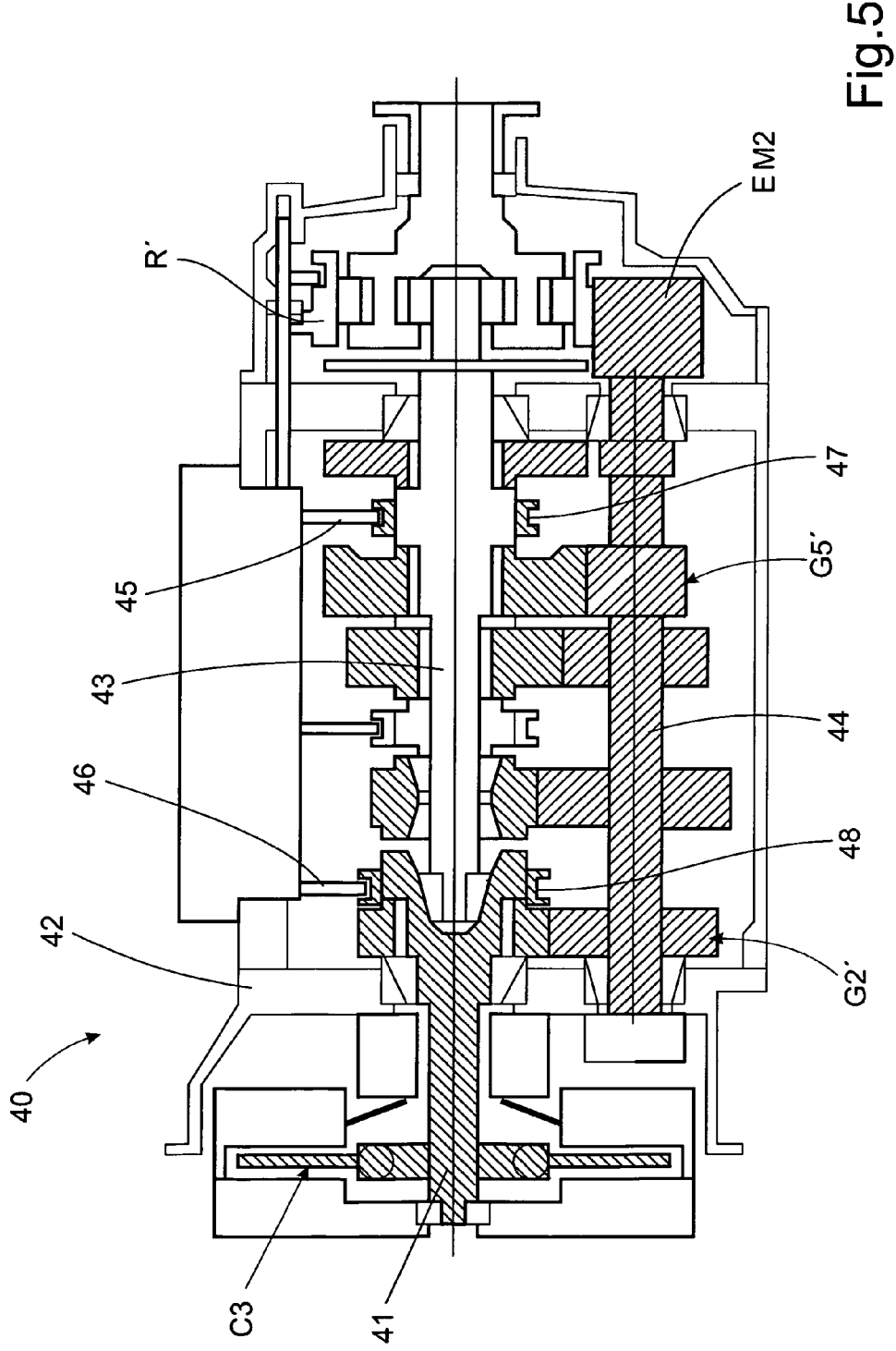
FIG. 5 shows a schematic cross-section of a transmission arrangement according to a first example of a second embodiment of the invention.

FIG. 5 shows a schematic cross-section of a transmission arrangement according to a first example of a second embodiment of the invention. The method according to this first example is carried out when the electric motor torque available from the electric machine is deemed to be near or below the torque required to ensure a successful cranking of the engine. This condition occurs when at least one detected engine related parameter is below a first set of predetermined limits or is outside a first range of predetermined limits.

The transmission arrangement is connected between the engine output shaft of an engine (not shown; see FIG. 2) and a drive shaft, which drive shaft is connectable to at least one pair of driving wheels (not shown). In this example the transmission arrangement comprises a single-clutch transmission 40 connectable between the crankshaft and the drive shaft. The single-clutch transmission comprises multiple rotatable components for transmitting torque from the engine to the driving wheels. The single-clutch transmission has a first input shaft 41 connected to a first clutch C3. The single-clutch transmission further comprises an output shaft 43 and at least a first countershaft 44 which are connectable to the first clutch C3 by means of a number of manually and/or automatically selectable gears. In this example, the selectable gears are first gear through fifth gear. An electric machine EM2 is mechanically connected to the countershaft 44 downstream of the clutch C3, so that the clutch is interposed between the electric machine and the engine. The electric machine EM2 is to be connected to the clutch by the actuation of one of the gears.

During an engine start-up, when the vehicle is normally stationary, the electric machine EM2 is connected to the clutch C3 under the control of an electronic control unit (not shown, see FIG. 1).

The starting method comprises the steps of:
detecting at least one engine related parameter to determine whether the electric machine EM2 is to be used for cranking the engine;
opening the clutch C3 to separate the electric machine from the engine; and
separating the electric machine EM2 from the driving wheels;

When it has been determined that assistance is required for engine start, the single-clutch transmission has been separated from the engine and the driven wheels, the following steps are carried out:
using the at least one detected engine related parameter to select rotatable components to be used for assisting engine start;
engaging an initial gear, connecting at least the countershaft 44 to the clutch C3;
operating the electric machine EM2 as a motor to rotate the selected rotatable components and to reach predetermined crank rotation speed; and
closing the clutch C3 when the electric machine EM2 reaches the crank rotation speed, in order to start the engine.

As stated above, the number of rotatable components in the single-clutch transmission to be used for assisting engine start is selected depending on the at least one detected engine related parameter. The starting method is primarily intended for use in low ambient temperatures, low engine coolant temperatures, and/or when it is detected that the energy storage used for cranking the engine may not be able to deliver sufficient torque for cranking the engine using the electric machine connected directly to one of the clutches. Hence, the at least one detected engine related parameter can be the ambient temperature, engine coolant temperature or state of charge (SOC) of the energy storage. If the engine is normally started by means of a separate starter motor acting on the engine flywheel, a detected condition can cause the electric machine to take over the function of the starter motor.

The selected crank rotation speed can be used for determining how the clutch is controlled to crank the engine. The electronic control unit can select a suitable closing speed for closing clutch during the cranking operation based on a predetermined parameter, such as the crank rotation speed.

According to this first example, the method involves operating the electric machine EM2 and using the rotary masses of the electric machine EM2, the countershaft 44, the first input shaft 41 and the first clutch C3 for assisting the electric machine EM2 when cranking the engine. The method according to the first example is carried out when one or more of the ambient temperature, engine coolant temperature, energy storage temperature and/or the state of charge (SOC) of the energy storage or starting battery have dropped below a first set of predetermined limits. This condition indicates that the electric machine will require a first predetermined level of assistance during engine start.

In this first example, the second gear G2' is used for connecting the countershaft 44 to the first clutch C3. The second gear G2' is selected by means of an actuator 48 using a shift fork 46 controlled by the ECU, which actuator 48 is displaced to engage the second gear G2'. When the electric machine EM2 is actuated, the countershaft 44 will drive both the first clutch C3, together with the first input shaft 41, through the second gear G2'. When the electric machine EM2 reaches the predetermined crank rotation speed the first clutch C3 is closed to crank and start the engine.

In this example, the torque from the electric machine EM2 will be transferred to the first clutch C3, together with the momentum from the first input shaft 41 and the countershaft 44 via the second gear G2'. In FIG. 5, the shading of the first clutch C3 and other rotatable components is used to indicate the first set of components used for cranking the engine.

According to the first example as described above, the electric machine EM2 is separated from the driving wheels by disconnecting the first input shafts 41 from the output shaft 43.

Figure 6:
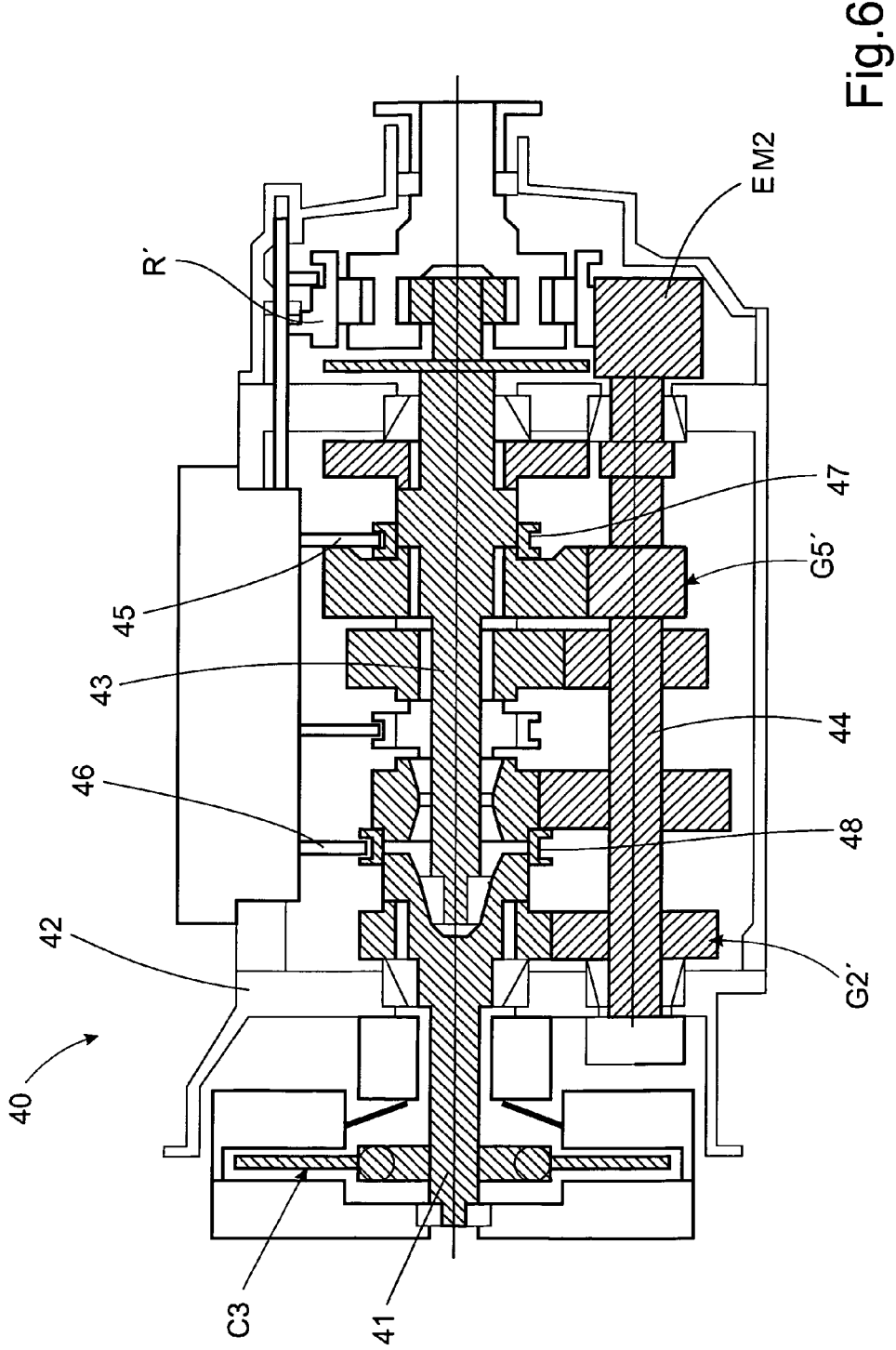
FIG. 6 shows a schematic cross-section of the transmission arrangement in FIG. 5 according to a second example of the second embodiment of the invention.

FIG. 6 shows a schematic cross-section of a transmission arrangement according to a second example of the second embodiment of the invention. The method according to the second example is carried out when the electric motor torque available from the electric machine in the first example of the second embodiment is deemed to be near or below the torque required to ensure a successful cranking of the engine. This condition occurs when at least one detected engine related parameter is below a second set of predetermined limits or is outside a second range of predetermined limits.

According to the second example, the method involves operating the electric machine and using the rotary masses of the electric machine EM2, the countershaft 44, the first input shaft 41, the first clutch C3, as well as the output shaft 43 for assisting the electric machine EM2 when cranking the engine. In this case, the output shaft 43 with its associated gears forms a second set of rotatable components. The method according to the second example is carried out when the electric machine is deemed to require assistance by the first and an additional, second set of selected set of rotatable transmission components during cranking. The method according to the second example is carried out when one or more of the ambient temperature, engine coolant temperature, energy storage temperature and/or the state of charge (SOC) of the energy storage or starting battery have dropped below a second set of predetermined limits. The second set of predetermined limits is lower than the first set of limits, indicating that the electric machine will require additional assistance, in excess of the predetermined level described in the first example (FIG. 5), during engine start.

In the second example a base gear, in the shown example, the fifth gear G5' is used for connecting the countershaft 44 and the output shaft 43 to the first clutch C3. The fifth gear G5' is selected by means of an actuator 47 using a shift fork 45 controlled by the ECU, which actuator 47 is displaced to engage the fifth gear G5'. At the same time, a further actuator 48 is controlled by the ECU to connect the first input shaft 41 and the output shaft 43. When the electric machine EM2 is actuated, the countershaft 44 will drive the first clutch C3, together with the first input shaft 31, and the output shaft 33 through the fifth gear G5'. When the electric machine EM2 reaches the predetermined crank rotation speed the first clutch C3 is closed to crank and start the engine. In this example, the momentum of the first clutch C3, the first input shaft 41 the output shaft 43 and the countershaft 44, as well as the torque from the electric machine EM2, will be transferred to the engine via the first clutch C3. The momentum of the countershaft 44 will be transferred to the output shaft 43 via the fifth gear G5', providing a predetermined gear ratio multiplier. In FIG. 6, the shading of the first clutch C3 and the associated components is used to indicate the first and second sets of components used for cranking the engine.

According to the second example as described above, the electric machine EM2 is separated from the driving wheels by disconnecting the output shaft 43 from a range gear R' interposed between the output shaft 43 and the driving wheels (not shown). This can be achieved by means of a clutch (not shown) in the range gear R'.

According to the method and examples given above, at least the temperature and/or the state of charge of an energy storage connected to an electric machine used for cranking the engine is detected. The energy storage can be a high voltage battery and/or a main storage battery used for propulsion. According to one example, it is determined that the electric machine is to be assisted during cranking of the engine when the temperature and/or the state of charge (SOC) of the energy storage are below a predetermined limit. In the case of a hybrid vehicle, the engine can be started by a separate starter motor or by the electric machine. If a low voltage condition is detected for a starter battery, the electric machine can take over the function of an existing starter motor. When the detected temperature and/or state of charge (SOC) are below a first predetermined limit, the electric machine is operated as a starter motor and is assisted using a predetermined number of rotary components in the dual-clutch or single transmission for cranking the engine. The operation of the electric machine and the dual/single-clutch transmission is controlled by an electronic control unit (ECU) in accordance with the first example described above. At least one predetermined limit for detected SOC can be stored in the ECU, where the degree of assistance provided by the dual/single-clutch transmission is decided by the current energy storage temperature and/or SOC. If the detected state of charge (SOC) is below a second predetermined limit, below the first limit, then the electric machine is operated in accordance with the second example described above. In the latter case, the electric machine is assisted using an additional number of rotary components in the dual/single-clutch transmission for cranking the engine.

According to a further example, it is determined that the electric machine is to be assisted during cranking of the engine when it is detected that the ambient temperature is below a predetermined limit. According to a further example, it is determined that the electric machine is to be assisted during cranking of the engine when it is detected that the engine coolant temperature is below a predetermined limit. The amount of assistance required for the electric machine can be determined by each of the above detected parameters individually or in combination. For instance, if one or more of the temperature and/or SOC of the energy storage, the ambient temperature and/or the engine coolant temperature is below a first predetermined limit, the ECU can decide that assistance according to the first example described above is sufficient for cranking the engine. However, if one or more of these parameters are below a second predetermined limit, then the ECU can decide that additional assistance according to the second example described above must be provided for cranking the engine.

An additional parameter that can be controlled in connection with the engine start is the rotation speed of the electric machine. The ECU can determine the crank rotation speed according to the at least one engine related parameter. For instance, additional torque can be provided for engine start by increasing the crank rotation speed if one or more detected engine related parameters are below a set of predetermined limit values. The selected crank rotation speed can be used for determining a closing speed of the closing clutch used during the cranking operation.

The present invention also relates to a computer program, computer program product and a storage medium for a computer all to be used with a computer for executing the method as described in any one of the above examples.

Figure 7:
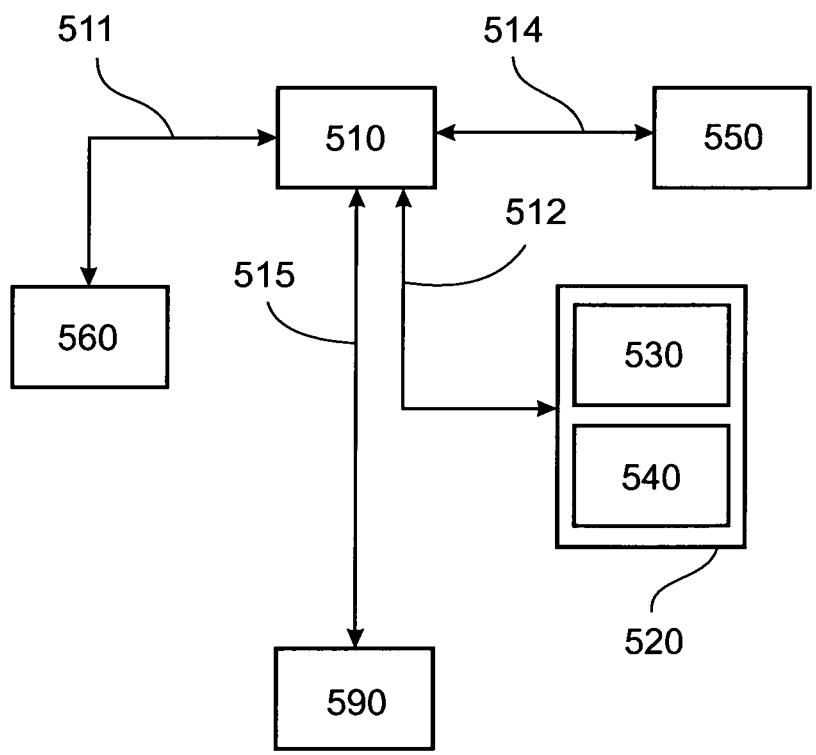
FIG. 7 shows the invention applied on a computer arrangement.

FIG. 7 shows an apparatus 500 according to one embodiment of the invention, comprising a nonvolatile memory 520, a processor 510 and a read and write memory 560. The memory 520 has a first memory part 530, in which a computer program for controlling the apparatus 500 is stored. The computer program in the memory part 530 for controlling the apparatus 500 can be an operating system.

The apparatus 500 can be enclosed in, for example, a control unit, such as the control unit 45. The data-processing unit 510 can comprise, for example, a microcomputer.

The memory 520 also has a second memory part 540, in which a program for controlling the method for starting an internal combustion engine according to the invention is stored. In an alternative embodiment, the program for controlling the method for starting is stored in a separate nonvolatile storage medium 550 for data, such as, for example, a CD or an exchangeable semiconductor memory. The program can be stored in an executable form or in a compressed state.

When it is stated below that the data-processing unit 510 runs a specific function, it should be clear that the data-processing unit 510 is running a specific part of the program stored in the memory 540 or a specific part of the program stored in the nonvolatile storage medium 550.

The data-processing unit 510 is tailored for communication with the storage memory 550 through a data bus 514. The data-processing unit 510 is also tailored for communication with the memory 520 through a data bus 512. In addition, the data-processing unit 510 is tailored for communication with the memory 560 through a data bus 511.

The data-processing unit 510 is also tailored for communication with a data port 590 by the use of a data bus 515.

The method according to the present invention can be executed by the data-processing unit 510, by the data-processing unit 510 running the program stored in the memory 540 or the program stored in the nonvolatile storage medium 550.

The invention should not be deemed to be limited to the embodiments described above, but rather a number of further variants and modifications are conceivable within the scope of the following patent claims.

The invention claimed is:

1. A method for starting an internal combustion engine of a hybrid vehicle, the vehicle comprising:
    the engine provided with an engine output shaft connectable to a driveline for driving at least one pair of driving wheels;
    a single or dual-clutch transmission, which transmission comprises multiple rotatable components for transmitting torque from the engine to the driving wheels;
    the transmission having at least one input shaft wherein at least one clutch is arranged to connect a corresponding input shaft to the engine,
    the transmission has an output shaft and at least a first countershaft which are connectable to the at least one clutch;
    an electric machine, which is mechanically connected to the first countershaft downstream of the at least one clutch, so that the at least one clutch is interposed between the electric machine and the engine;
    wherein the method comprises the steps of:
    detecting at least one engine related parameter to determine whether the electric machine is to be assisted for cranking the engine;
    opening at least one clutch of the at least one clutch to separate the electric machine from the engine;
    controlling the transmission for separating the electric machine from the driving wheels;
    selecting at least one of a number of sets of rotatable transmission components to be used for assisting engine start, based on the at least one detected engine related parameter;
    engaging at least one gear, connecting the at least one selected set of rotatable transmission components to the at least one clutch;
    operating the electric machine as a motor to rotate the at least one selected set of rotatable transmission components and to reach predetermined crank rotation speed; and
    closing at least one clutch of the at least one clutch when the electric machine reaches the crank rotation speed, in order to start the engine.

2. The method according to claim 1, comprising operating the electric machine and selecting a first set of rotatable components for assisting engine start when at least one detected engine related parameter is below a first predetermined limit.

3. The method according to claim 2, comprising operating the electric machine and selecting a second set of rotatable components for assisting engine start when at least one detected engine related parameter is below a second predetermined limit.

4. The method according to claim 3, wherein the moment of inertia of the second set of rotatable components is greater than the moment of inertia of the first set of rotatable components.

5. The method according to claim 1, comprising detecting the state of charge of an energy storage and determining that the electric, machine is to be assisted for cranking the engine when the state of charge is below at least a first predetermined limit.

6. The method according to claim 1, comprising detecting the energy storage temperature and determining that the electric machine is to be assisted for cranking the engine when the energy storage temperature is below at least a first predetermined limit.

7. The method according to claim 1, comprising detecting the ambient temperature and determining that the electric machine is to be assisted for cranking the engine when the ambient temperature is below at least a first predetermined limit.

8. The method according to claim 1, comprising detecting the coolant temperature of the engine and determining that the electric machine is to be assisted for cranking the engine when the coolant temperature is below at least a first predetermined limit.

9. The method according to claim 1, wherein the transmission is a dual-clutch transmission having first and second input shafts of the at least one input shaft, of which the first input shaft is connected to a first clutch of the at least one clutch and the second input shaft is connected to a second clutch of the at least one clutch, the output shaft of the transmission and at least the first countershaft, where the output shaft of the transmission and the first countershaft are connectable to the first clutch and the second clutch, respectively; comprising the steps of:
   engaging an initial, gear, connecting at least the first countershaft to one clutch of the first and second clutches;
   engaging a further gear, connecting at least the first countershaft to other clutch of the first and second clutches;
   operating the electric machine as a motor to rotate the selected rotatable components and to reach predetermined crank rotation speed; and
   closing one of the first and second clutches when the electric machine reaches the crank rotation speed, in order to start the engine.

10. The method according to claim 9, comprising operating the electric machine and using a first set of rotatable components, comprising the rotary masses of the electric machine, the first countershaft, the first and second input shafts and the first and second clutches, for assisting the electric machine when cranking the engine.

11. The method according to claim 10, comprising using the first gear for connecting the first countershaft to the first clutch.

12. The method according to claim 10, comprising using the second gear for connecting the first countershaft to the second clutch.

13. The method according to claim 10, comprising using the second gear for connecting the first countershaft to the first clutch.

14. The method according to claim 9, comprising closing the second clutch when the electric machine reaches the crank rotation speed.

15. The method according to claim 9, comprising separating the electric machine from the driving wheels by disconnecting the first and second input shafts from the output shaft of the transmission.

16. The method according to claim 9, comprising operating the electric machine and using a first and a second set of rotatable components, comprising the rotary masses of the electric machine, the first countershaft, the first and second input shafts, the first and second clutches and the output shaft of the transmission, for assisting the electric machine when cranking the engine.

17. The method according to claim 16, comprising using the second gear for connecting the first countershaft to the second clutch.

18. The method according to claim 16, comprising using a base gear for connecting the first countershaft and the output shaft for starting an internal combustion engine of a hybrid vehicle to the first clutch.

19. The method according to claim 9, comprising closing the first clutch when the electric machine reaches the crank rotation speed.

20. The method according to claim 9, comprising separating the electric machine from the driving wheels by disconnecting the output shaft of the transmission from a range gear interposed between the output shaft of the transmission and the driving wheels.

21. The method according to claim 1, wherein the transmission a single clutch transmission having an input shaft of the at least one input shaft, connected to a first clutch of the at least one clutch, the output shaft of the transmission and at least the first countershaft, where the output shaft of the transmission and the first countershaft are connectable to the first clutch; comprising the steps of:
   engaging an initial gear, connecting at least the first countershaft to the first clutch;
   operating the electric machine as a motor to rotate the selected rotatable components and to reach predetermined crank rotation speed; and
   closing the first clutch when the electric machine reaches the crank rotation speed, in order to start the engine.

22. The method according to claim 21, comprising operating the electric machine and using a first set of rotatable components, comprising the rotary masses of the electric machine, the first countershaft, the first input shaft and the first clutch, for assisting the electric machine when cranking the engine.

23. The method according to claim 21, comprising closing the first clutch when the electric machine reaches the crank rotation speed.

24. The method according to claim 21, comprising operating the electric machine (EM2) and using a first and a second set of rotatable components, comprising the rotary masses of the electric machine, the first countershaft, the first input shaft, the first clutch and the output shaft of the transmission, for assisting the electric machine when cranking the engine.

25. The method according to claim 24, comprising using a base gear for connecting the first countershaft and the output shaft of the transmission to the first clutch.

26. The method according to claim 24, comprising closing the first clutch when the electric machine reaches the crank rotation speed.

27. The method according to claim 24, comprising separating the electric machine from the driving wheels by disconnecting the output shaft of the transmission from a range gear interposed between the output shaft of the transmission and the driving wheels.

28. A vehicle comprising an internal combustion engine and a single or dual-clutch transmission, wherein the engine is started by means of the method according to claim 1.

29. A computer comprising a computer program for performing all the steps of claim 1.

30. A computer program product comprising a computer program stored on a non-transitory computer readable medium for performing all steps of claim 1 when the program product is run on a computer.

31. A non-transitory storage medium I'm use in a computing environment, comprising a computer readable program to perform the method of claim 1.

* * * * *